May 20, 1930. T. W. ROLPH 1,758,977
REFLECTING PRISM
Filed April 21, 1926   2 Sheets-Sheet 1

INVENTOR
Thomas W. Rolph
BY Joe Blueberman
his ATTORNEY

May 20, 1930. T. W. ROLPH 1,758,977
REFLECTING PRISM
Filed April 21, 1926 2 Sheets-Sheet 2
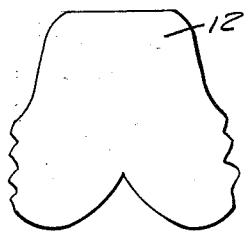
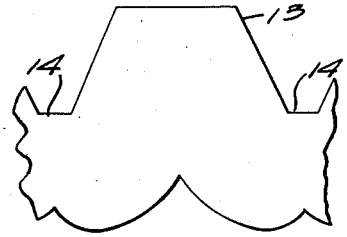
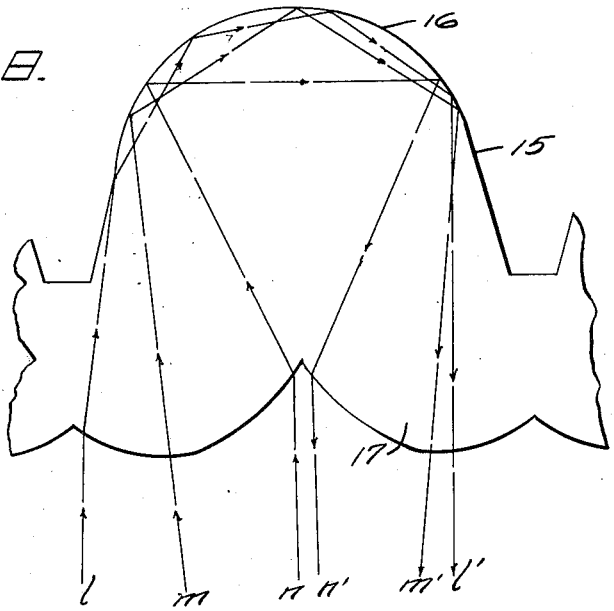
INVENTOR
Thomas W. Rolph
BY
*[signature]*
his ATTORNEY Patented May 20, 1930

1,758,977

UNITED STATES PATENT OFFICE

THOMAS W. ROLPH, OF NEWARK, OHIO, ASSIGNOR TO HOLOPHANE COMPANY, INC., OF NEW YORK, N. Y., A CORPORATION OF NEW YORK

REFLECTING PRISM

Application filed April 21, 1926. Serial No. 103,446.

The object of this invention is the construction of a prismatic arrangement which will serve to increase the amount of light reflected from a luminaire. Double reflecting prisms are commonly used for prismatic reflecting devices. They depend upon total reflection of the light at each of the two reflecting surfaces of the prisms so that each light ray is sent back in the direction from which it came. With practical light sources such prisms are efficient reflectors but at certain angles a large part of the light is transmitted and not reflected.

A triple reflecting prism will increase the angular range within which light is totally reflected but on the other hand it has one surface which transmits light directly. It is the object of this invention to modify the direction of the light incident upon such prisms so that the amount of light reflected from the prism will be greatly increased.

Figure 1:
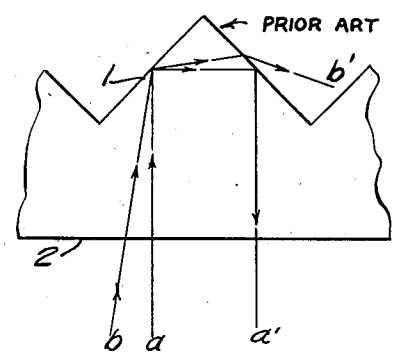
Figure 2:
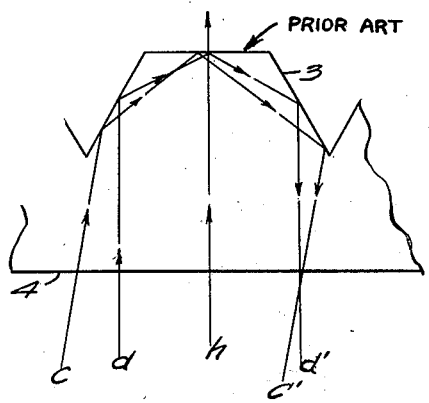

In the drawing Figs. 1 and 2 are cross sections of conventional forms of double and triple reflecting prisms, respectively.

Figs. 3 to 8 inclusive are cross sections of prisms constructed according to my invention.

Referring to the drawing in detail, Fig. 1 shows in cross section a double reflecting prism 1 of conventional form. This is usually made at an angle of 90°. Light ray "$a$" passing into the glass normal to the inner surface of the glass is reflected from both surfaces of the prism 1 and passes out in the direction from which it came. If, however, the light enters the glass at an angle other than the normal the angle of incidence at one of the two reflecting surfaces is increased and at the other reflecting surface is decreased. When this decrease in angle of incidence is sufficient in amount (depending upon the index of refraction of the glass) the light ray is no longer totally reflected but is in part transmitted at that particular surface. In Fig. 1 light ray "$b$" is shown entering the glass at such an angle from "$a$" that it is transmitted at the second reflecting surface. "$a'$" and "$b'$" show the direction of the rays after they have been bent as above explained.

Fig. 2 shows a triple reflecting prism 3 of conventional form. In this case the angles of incidence on the reflecting surfaces are greater than in the case of the double reflecting prism. The reason is that three reflections are used to turn the light back upon itself, or in other words, to turn it through 180°. Each reflection turns the light ray 60° from its former path, whereas, each reflection in the double reflecting prism turns the light ray 90° from its former path. In Fig. 2, light ray $d$ is shown entering the glass at the normal, reflected three times and returning in the direction "$d'$" from which it came. Light ray "$c$" entering the glass at the same angle as "$b$" in Fig. 1, is totally reflected in Fig. 2 because it strikes each of the three surfaces at angles insuring total reflection emerging in direction "$c'$". Therefore the triple reflecting prism shown in Fig. 2 would reflect more light than the double reflecting prism shown in Fig. 1, except for the fact that all the light which strikes directly the central surface of the prism 1 is transmitted directly. This is illustrated by light ray "$h$" in Fig. 2.

Figure 3:
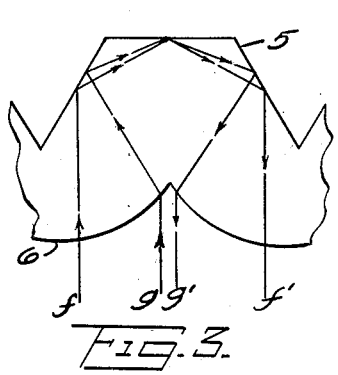

In the present invention I have modified the inner surfaces of the medium in such a way as to decrease the amount of light which will strike this central surface of the triple reflecting prism, without first striking one of the side surfaces. Fig. 3 is an illustration of one form of this modified prismatic construction. Opposite the triple reflecting prism 5 is placed a refracting formation 6 which turns a part of the incident light, which would otherwise be transmitted, so that after entering the medium it strikes one of the side reflecting surfaces of the prism. Light ray "$f$" in Fig. 3 goes directly to one of these side reflecting surfaces without refraction at the inner surface. It is totally reflected by three reflections and emerges in direction "$f'$". Light ray "$g$", which would be directly transmitted if it were not for the inner refracting formation 6, is refracted so that it strikes the nearest side reflecting surface of the prism. It is then totally reflected three times, one at each of the three reflecting surfaces and emerges in direction "$g'$".

Figure 4:
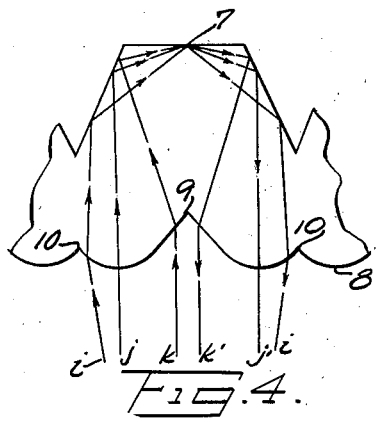

Fig. 3 shows a single dip in the inner surface 6 of the glass and this is the simplest construction to accomplish the object. Fig. 4, however, shows another construction in which the inner surface 8 forms a depression 9 opposite the center of the prism and also at 10 opposite each end of the prism. Other refracting formations may also be used. The inner surface corresponds in effect to a lens formation which concentrates the light upon the side reflecting surfaces of the triple reflecting prism. Triple reflecting prism 7 is similar to that shown in Fig. 3. The incident light rays "$i$", "$j$" and "$k$" are reflected three times and emerge at "$i'$", "$j'$" and "$k'$" respectively.

Figure 5:
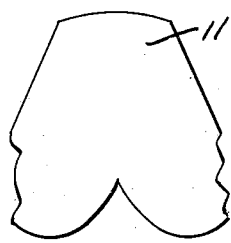

The surfaces of the triple reflecting prisms may be either flat surfaces or curved surfaces. Fig. 5 and Fig. 6 show possible modifications in curvature, 11 and 12 respectively, which have certain advantages. Whether the surface be flat or curved depends upon details of the prismatic design.

When these prisms are used to make a reflector, the prisms on the outer surface of the reflector may be directly adjacent as at 7 in Fig. 4, or the prisms 13 may be separated by flat spaces 14 as in Fig. 7, or they may be separated by prisms of other types. Fig. 7 illustrates a possible construction in which it would be of advantage to have the prisms separated by flat spaces.

A modification of this general idea is illustrated in Fig. 8. In this case, a portion of the contour of the reflecting prism 15 is in the form of a circle 16. All light striking this portion of the contour at angles insuring total reflection will, after reflection, strike other parts of the circular contour at the same angle. This follows geometrically from the fact that the angle of incidence is always equal to the angle of reflection and each reflected light ray forms the chord of an arc of the circular contour and makes the same angle with the radius at each end. Consequently, if the light from the inner surface of the glass can be refracted in such a way that it will all strike (directly, or after reflection from the side of the prism) the circular contour at angles insuring total reflection, the light will then be reflected a number of times from the circular contour and emerge in the general direction from which it came. Some of the light will be reflected only two or three times, some of it will be reflected a great many times. Any light which strikes the circular contour of the prism at high angles of incidence is reflected many times before it emerges. The inner section of the glass is made with lens formations 17 similar to those illustrated in previous figures and these formations direct the light to the circular part of the prism or to the side of the prism which in turn directs the light to the circular part of the prism at angles which insure total reflection. The sides of the prism may be straight or curved. Light rays "$l$", "$m$" and "$n$" will be reflected several times and emerge in directions "$l'$", "$m'$" and "$n'$".

There are numerous modifications of this type of prism however obvious to one skilled in the art. The general idea however is that of utilizing a prism reflecting the light three or more times and providing, on the opposite surface of the medium, a lenticular formation which will greatly increase the amount of light reflected from a prism of this character.

In the claims we have characterized the reflecting prism as being constructed to reflect the light ray at least three times in the same plane. In order to obtain this result it is necessary to construct prisms in which the sides do not converge to a point as has been the custom in constructions having triple reflecting prisms heretofore, but in the prisms shown and described herein the apex of the prisms is either constructed as a flat surface or else the sides converged in a rounded or flattened surface.

By means of this construction the light ray before reflection, after reflection the first time and after reflection the second or later times, always lies in a single plane. This plane being the plane of the paper in the figures accompanying the specification.

I claim:

1. A reflecting prism constructed of two reflecting sides and a connecting reflecting surface extending over the top of the prism constructed to reflect a light ray at least three times in the same plane and plural lenticular refracting formations at the base of the prism opposed thereto, one at each side of its center and adapted to confine the entering light to the sides of the reflecting prism so as to increase the amount of light reflected.

2. A reflector provided with reflecting prisms each constructed of two reflecting sides and a connecting reflecting surface extending over the top of the prism constructed to reflect a light ray at least three times in the same plane and plural lenticular refracting formations at the base of the prism opposed thereto, one at each side of its center and adapted to confine the entering light to the sides of the reflecting prism so as to increase the amount of light reflected.

Signed at New York, in the county of New York and State of New York, this 19th day of April, 1926.

THOMAS W. ROLPH.